United States Patent
Infante-Lopez et al.

(10) Patent No.: US 11,140,179 B1
(45) Date of Patent: Oct. 5, 2021

(54) CYBERSECURITY INVESTIGATION TOOLS UTILIZING INFORMATION GRAPHS

(71) Applicant: McAfee, LLC, Santa Clara, CA (US)

(72) Inventors: Gabriel G. Infante-Lopez, Cordoba (AR); Hemang Satish Nadkarni, Cupertino, CA (US); Pablo Andres Michelis, San Jose, CA (US); Francisco Matias Cuenca-Acuna, Cordoba (AR); Matias L. Marenchino, Cordoba (AR); Maria Torino, Cordoba (AR)

(73) Assignee: Musarubra US LLC, San Jose, CA (US)

(*) Notice: Subject to any disclaimer, the term of this patent is extended or adjusted under 35 U.S.C. 154(b) by 299 days.

(21) Appl. No.: 16/232,296

(22) Filed: Dec. 26, 2018

(51) Int. Cl.
*H04L 29/06* (2006.01)
*G06F 16/901* (2019.01)

(52) U.S. Cl.
CPC ...... *H04L 63/1416* (2013.01); *G06F 16/9024* (2019.01); *H04L 63/1425* (2013.01)

(58) Field of Classification Search
CPC ............. H04L 63/1416; H04L 63/1425; G06F 16/9024
See application file for complete search history.

(56) References Cited

U.S. PATENT DOCUMENTS

| | | | | |
|---|---|---|---|---|
| 9,117,079 | B1* | 8/2015 | Huang | G06F 9/44505 |
| 9,516,053 | B1* | 12/2016 | Muddu | H04L 63/1416 |
| 9,928,365 | B1* | 3/2018 | Anderson | G06F 16/1734 |
| 2016/0285914 | A1* | 9/2016 | Singh | G06F 21/00 |
| 2018/0046928 | A1* | 2/2018 | Jang | H04L 63/1416 |

OTHER PUBLICATIONS

McAfee, "McAfee Investigator: Transform Analysts into Expert Investigators," May 2018, 4 pages.
McAfee, "McAfee Investigator Product Guide," 2018, 17 pages.

* cited by examiner

*Primary Examiner* — Ali S Abyaneh
*Assistant Examiner* — Shu Chun Gao
(74) *Attorney, Agent, or Firm* — Hanley, Flight & Zimmerman, LLC

(57) ABSTRACT

Example apparatus disclosed herein to perform a cybersecurity investigation include a graph generator to iteratively generate an information graph based on investigative data in response to detection of a threat alert in a monitored network, the investigative data accessed from information sources based on a set of information seeker tools, the information graph generated based on a graph schema specifying possible relationships between the information seeker tools. Example apparatus also include a pattern recognizer to traverse the information graph to identify a path in the information graph matching a pattern from the graph schema associated with a cybersecurity threat. Example apparatus further include a user interface to output the path identified in the information graph and the cybersecurity threat to an output device.

14 Claims, 10 Drawing Sheets

CYBERSECURITY INVESTIGATION TOOLS UTILIZING INFORMATION GRAPHS

FIELD OF THE DISCLOSURE

This disclosure relates generally to cybersecurity and, more particularly, to cybersecurity investigation tools utilizing information graphs.

BACKGROUND

A cybersecurity investigation in response to a detected alert associated with a cyberattack typically involves an iterative cycle of (i) uncovering part of an attack pattern hidden in activity data, (ii) drawing inferences from the uncovered pattern, and (iii) making decisions based on the inferences to further expand the pattern. This iterative investigation cycle can be dynamic and is driven by the emerging picture of the attack. Analysts at a Security Operations Center (SOC) manually triage and investigate alerts, and subsequently respond to uncovered threats (e.g., such as uncovered cyberattacks).

BRIEF DESCRIPTION OF THE DRAWINGS

The figures are not to scale. In general, the same reference numbers will be used throughout the drawing(s) and accompanying written description to refer to the same or like parts, elements, etc.

DETAILED DESCRIPTION

Figure 1:
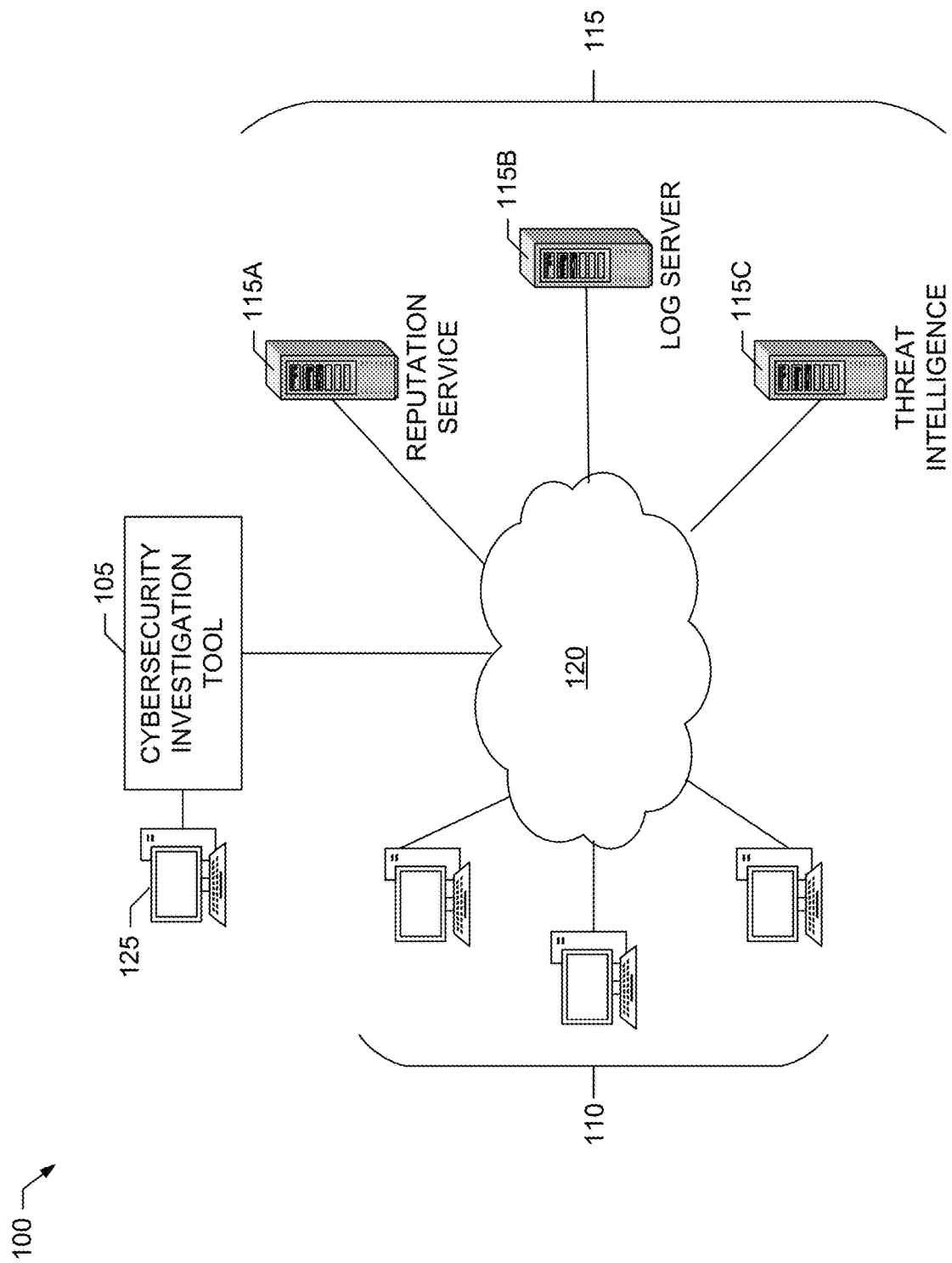
FIG. 1 is a block diagram of an example environment of use including an example cybersecurity investigation tool structured to use information graphs to perform cybersecurity investigations in accordance with teachings of this disclosure.

As mentioned above, a cybersecurity investigation in response to a detected alert associated with a potential cyberthreat, such as a cyberattack, typically involves an iterative process of (i) uncovering part of an attack pattern hidden in activity data, (ii) drawing inferences from the uncovered pattern, and (iii) making decisions based on the inferences to further expand the pattern. This iterative investigation cycle can be dynamic and is driven by the emerging picture of the attack. For example, the correct next investigation iteration may be unclear until new evidence obtained in the current iteration has been analyzed, and initial inferences may turn out to be incorrect.

In the past, SOCs have had to rely on analysts to manually triage and investigate alerts, and subsequently respond to uncovered threats (e.g., such as uncovered cyberattacks). There are several challenges with such traditional cybersecurity investigation approaches. For example, the sheer volume of alerts to be inspected can result in alert fatigue and, thus, many alerts may receive insufficient attention. Also, substantial time and manual effort may be involved in gathering information and evidence relevant to the investigation from disparate data sources. Further, advanced attacks require significant knowledge and expertise to uncover and investigate in a timely fashion. However, organizations may lack the requisite expertise, which may result in attacks not being fully scoped and the attacker surviving remediation attempts.

Automating parts of the investigation process and teaming the SOC analysts with machine intelligence would improve effectiveness and efficiency of the SOC analysts. However, present technology is unable to capture the nuances of the threat investigation process. For example, present technology falls short with respect to applying advanced analytics and data science that would allow learning, mining, and understanding of tactics and strategies of attackers and defenders.

Recent efforts in the field of cybersecurity investigation attempt to model an investigation as a computational process. However, they fall short. For example, some recent cybersecurity investigation approaches treat an investigation as a repeatable procedural playbook or recipe to be orchestrated. However, such approaches provide limited coverage, and leave aside the notion of searching for patterns or drawing inferences. What is needed is a better approach to model threat investigations as a computational process that enables human and machine teaming, and better leverages machine intelligence and automation to drive more effective and efficient threat investigations.

Example methods, apparatus, systems and articles of manufacture (e.g., physical storage media) disclosed herein implement cybersecurity investigation tools utilizing information graphs to provide technical solutions that overcome the limitations of prior cybersecurity investigation approaches described above. Disclosed example cybersecurity investigation tools utilizing information graphs provide (i) a mechanism to intelligently gather investigative data (e.g., on demand and/or based on expert knowledge) to drive the cybersecurity investigation, (ii) a mechanism to relate different pieces of investigative data to each other, and (iii) a mechanism to look for patterns in the investigative data gathered and linked by the other two mechanisms. These mechanisms can be implemented in many different ways. For example, disclosed example cybersecurity investigation tools employ novel functions and graph schema to gather the investigative data, employ information graphs to link the investigative data, and employ searching for patterns in the information graphs to identify cybersecurity threats.

Turning to the figures, a block diagram of an example environment of use 100 including an example cybersecurity investigation tool 105 structured to use information graphs to perform cybersecurity investigations in accordance with teachings of this disclosure is illustrated in FIG. 1. In the illustrated example of FIG. 1, the cybersecurity investigation tool 105 is to perform cybersecurity investigations for a collection of example computing devices 110. For example, the cybersecurity investigation tool 105 may be employed at an SOC and the computing devices 110 may be associated with an enterprise, a managed service provider (MSP), a managed security service provider (MSSP), a cloud service, a data center, etc. As such, the computing devices 110 can include any type(s) and/or number(s) of computing devices, smart appliances, media devices, etc., such as, but not limited to, personal computers, notebook computers, smartphones, tablet computers, Internet of Things (IoT) devices, etc., or any combination thereof.

As described in further detail below, to perform cybersecurity investigations, the cybersecurity investigation tool 105 accesses investigative data from one or more example information sources 115. In the illustrated example, the information sources 115 include an example reputation service 115A, and example log server 115B and an example threat intelligence knowledge database 115C. However, the cybersecurity investigation tool 105 can be configured to access other information source(s) in addition and/or as an alternative to the information sources 115 illustrated in the example of FIG. 1. As such, the information sources 115 can include any type(s) and/or number(s) web servers, database servers, cloud servers, etc., and/or any type of server or computing device capable of providing investigative data to the cybersecurity investigation tool 105.

In the illustrated example of FIG. 1, the cybersecurity investigation tool 105 communicates with the computing devices 110 and the information sources 115 via an example network 120. The network 120 can correspond to any type(s) and/or number(s) of networks, such as, but not limited to, a public network (such as the Internet), a private network, etc., or any combination thereof.

As described in further detail below, the cybersecurity investigation tool 105 utilizes information graphs, and supporting functions and graph schema, to (i) gather investigative data to drive a cybersecurity investigation associated with an alert event detected from one or more of the computing devices 110, (ii) relate different pieces of investigative data to each other, and (iii) look for patterns in the investigative data gathered and linked by (i) and (ii). In the illustrated example, the cybersecurity investigation tool 105 is in communication with an example analyst workstation 125 via which results of an investigation performed by the cybersecurity investigation tool 105 can be output. In some examples, the cybersecurity investigation tool 105 accepts inputs from the workstation 125 that can be used to initiate and/or adjust the investigation performed by the cybersecurity investigation tool 105. As such, the workstation 125 can be implemented by any type(s) and/or number(s) of computing devices, such as, but not limited to, personal computers, notebook computers, smartphones, tablet computers, computing terminals, etc.

Figure 2:
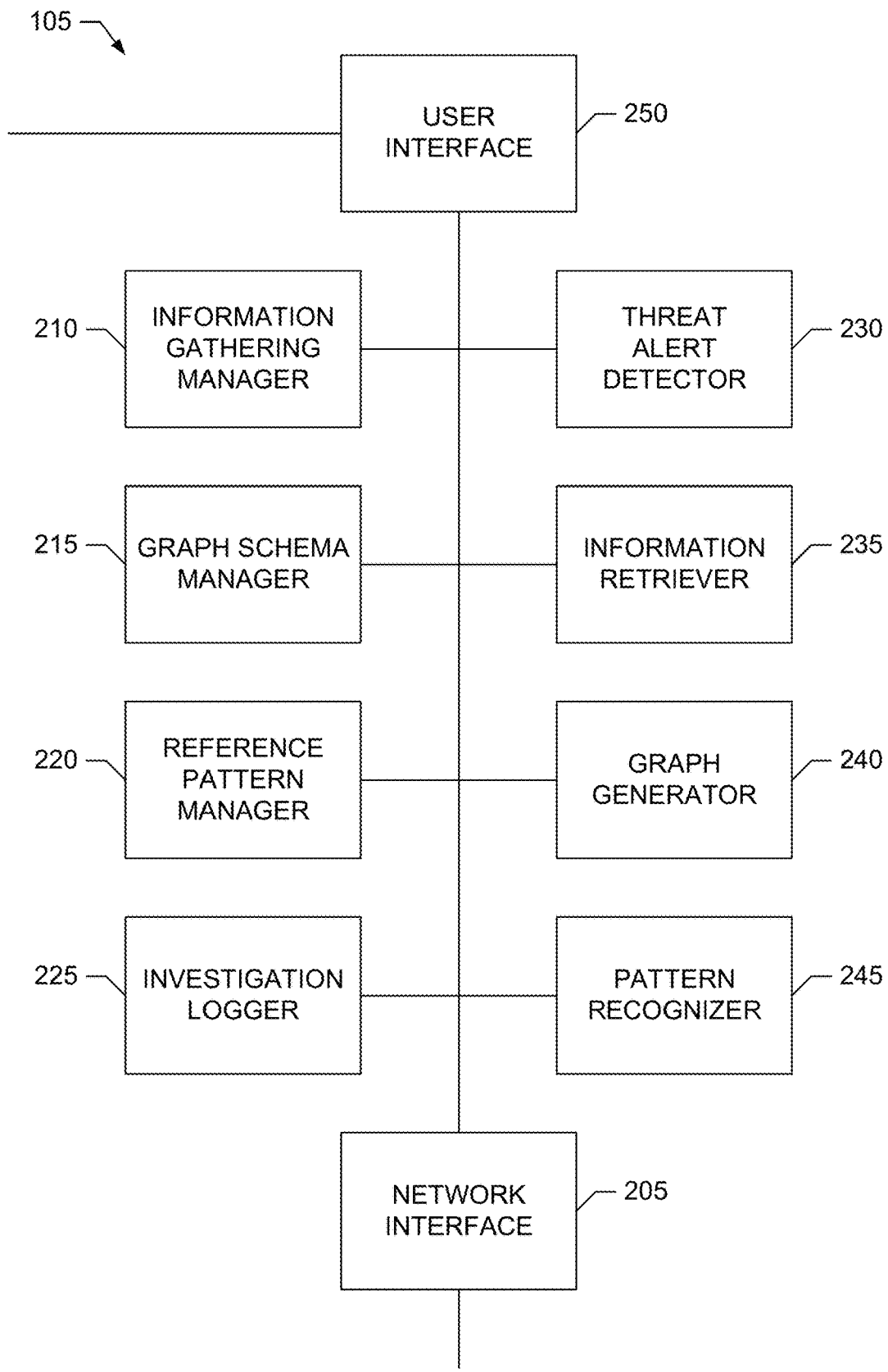
FIG. 2 is a block diagram of an example implementation of the cybersecurity investigation tool of FIG. 1.

A block diagram of an example implementation of the cybersecurity investigation tool 105 of FIG. 1 is illustrated in FIG. 2. The example cybersecurity investigation tool 105 of FIG. 2 includes an example network interface 205, an example information gathering manager 210, an example graph schema manager 215, an example reference pattern manager 220, an example investigation logger 225, an example threat alert detector 230, an example information retriever 235, an example graph generator 240, an example pattern recognizer 245 and an example user interface 250. In the illustrated example of FIG. 2, the network interface 205 is implemented by any network interface device, card, chip, etc., capable of interfacing with the network 120 of FIG. 1.

The example cybersecurity investigation tool 105 of FIG. 2 performs a cybersecurity investigation as a combination of an information gathering procedure, an information linking procedure, and a procedure to search for patterns over the linked information. The cybersecurity investigation tool 105 employs a grammar to describe the type of information (and interrelationships) relevant to a typical investigation case. The grammar describes how data of interest (e.g., diverse threat signals, related attack artifacts, activities, etc.) connect to each other. The cybersecurity investigation tool 105 applies the grammar to available data sources, seeded by an initial data point (e.g., corresponding to an initial threat alert event) to construct a graph. The cybersecurity investigation tool 105 also performs graph traversal to find patterns in the investigative data to draw inferences.

With the foregoing in mind, the cybersecurity investigation tool 105 includes the information gathering manager 210 to manage (e.g., create, store, update, delete, etc.) a set of information gathering functions employed by the cybersecurity investigation tool 105 to access investigative data from information sources, such as the information sources 115. The information gathering functions managed by the information gathering manager 210 are also referred to herein as information seekers or information seeker tools. A given function (also referred to herein as an information seeker or information seeker tool) managed by the information gathering manager 210 specifies the output data to be obtained for given input data and specifies the input-output relationships between the input(s) and output(s) of the given function. The given function also includes one or more executable procedures to obtain the output data (e.g., by accessing one or more of the information sources 115) corresponding to the given input data applied to the input(s) of the function.

In some examples, the information gathering functions managed by the information gathering manager 210 are semantically annotated functions each represented by a pair (f, l), where:

f is a strongly typed function with signature $T_1, \ldots, T_n \rightarrow T$ and;

l is a list of 3-tuples given by (a, name, b), where a and b are vertices of specific types and name is an edge.

A vertex of a given type typically maps to a type of data (e.g., such as a user, a device, a snapshot of a device, a uniform resource locator, a process, etc.) relevant to an investigation, and edges map to relationships (e.g., activities, characteristics, etc.) that relate the input and output vertices of functions. A given function, when executed, obtains new relevant investigative data for the investigation and links the new data to existing investigative data.

Figure 3:
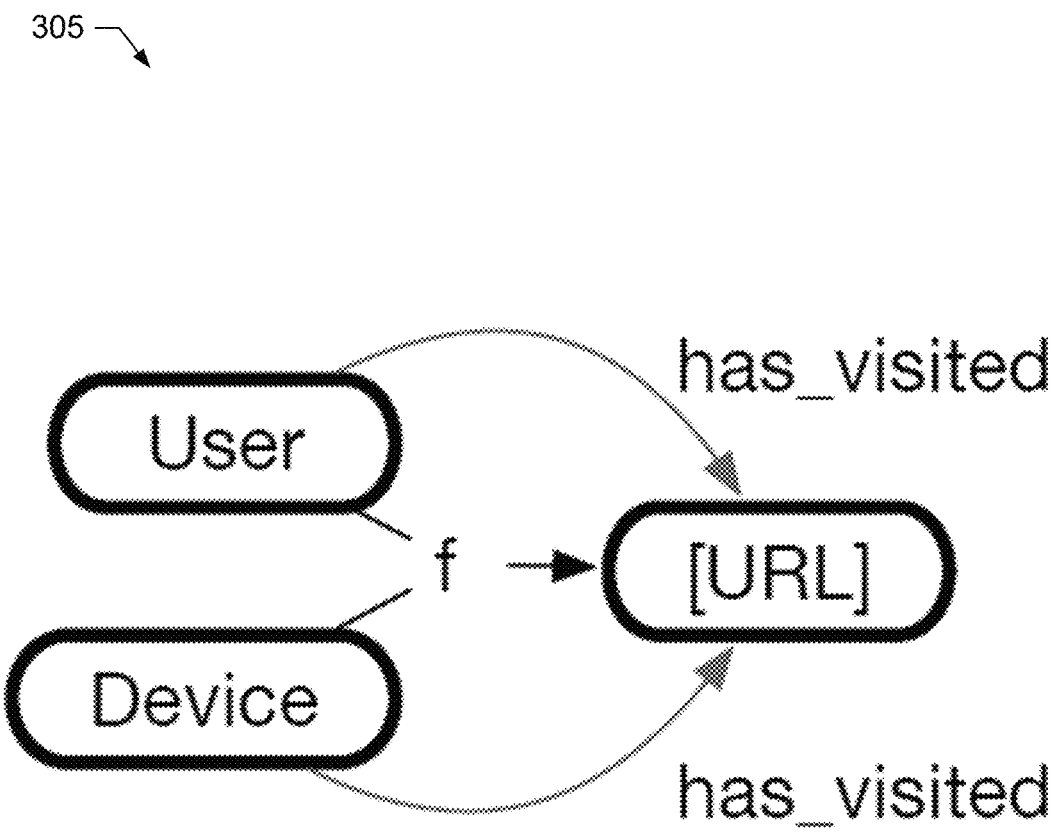
FIG. 3 illustrates an example function to be used by the cybersecurity investigation tool to obtain investigative data in accordance with teachings of this disclosure.

FIG. 3 illustrates an example function 305 managed by the information gathering manager 210. The example function obtains the uniform resource locators (URLs) that a given user has visited from a given device. The example function 305, represented by the variable f in FIG. 3, is graphically represented in an information graph as an example signature of the form connected vertices User, Device→List[URL], which means that the inputs User and Device produce the output list of URLs, represented by List[URL]. The graphical representation of the example function 305 also contains two edges, the first one from User to List[URL] with label has visited, and the second one from Device to List[URL] with the same label. The example function 305 further specifies a procedure to be executed to obtain (e.g., by accessing the log server 115B) the list of URLs (List[URL]) accessed by the input user (User) from the input device (Device).

Figure 4:
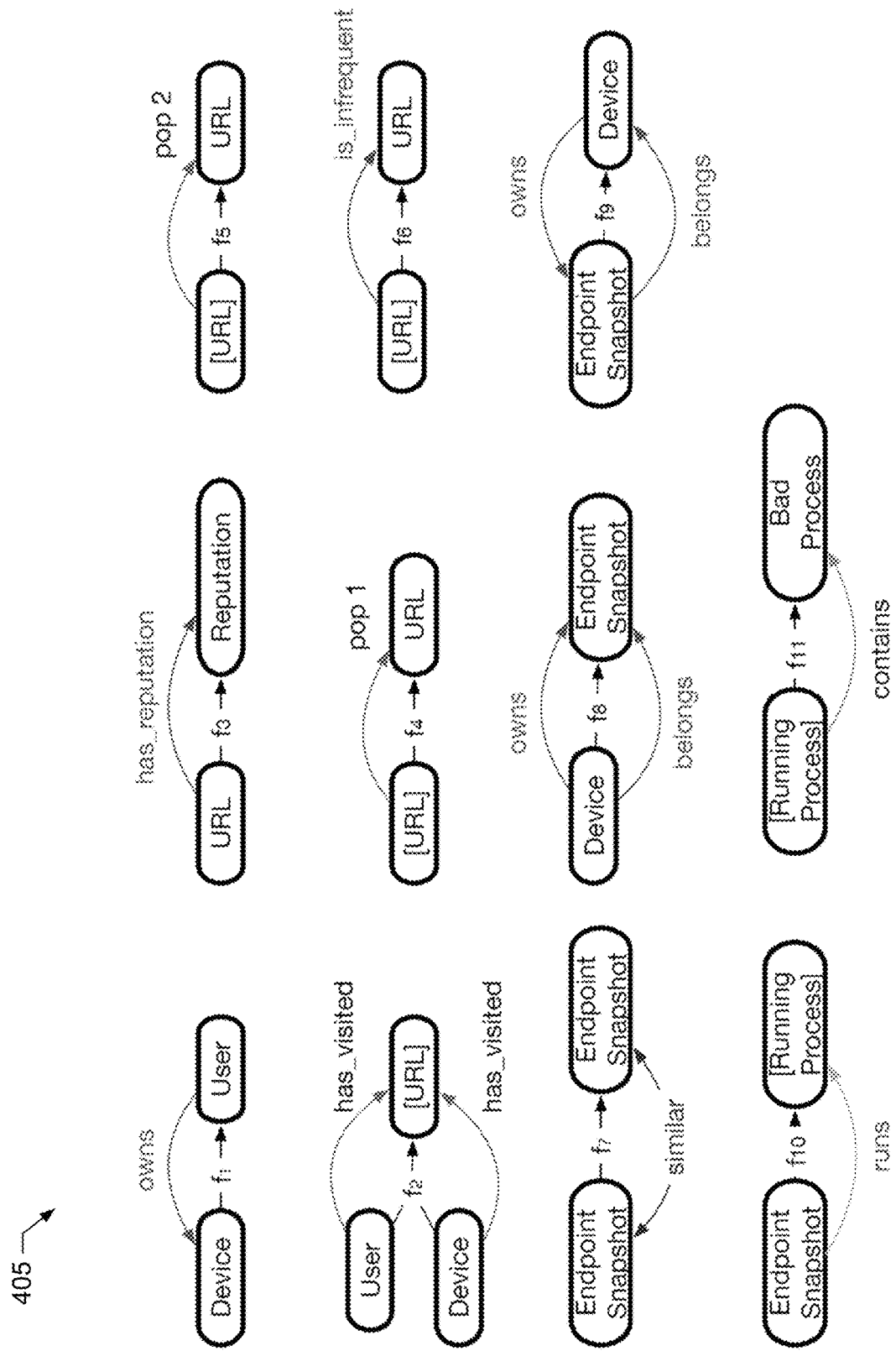
FIG. 4 illustrates an example collection of functions to be used by the cybersecurity investigation tool to obtain investigative data in accordance with teachings of this disclosure

FIG. 4 illustrates an example function set 405 including a set of functions managed by the information gathering manager 210. The function set 405 is also referred to herein as an example information gathering grammar (IGG) 405, which is a set of semantically annotated functions that collectively gather the investigative data for a cybersecurity investigation performed by the cybersecurity investigation tool 105. In the example IGG 405 of FIG. 4, the function $f_1$ is a function that outputs an owner of an input device. In the example IGG 405 of FIG. 4, the function $f_2$ corresponds to the example function 305 of FIG. 3. In the example IGG 405 of FIG. 4, the function $f_3$ is a function that obtains the reputation of a given URL. For example, the function $f_3$ may implement a procedure to access the reputation service 115A (e.g., such as the reputation service VirusTotal) to obtain the reputation for an input URL. In the example IGG 405 of FIG. 4, the functions $f_4$ and $f_5$ are projection functions that extract the first and the second element, respectively, on a list. In the example IGG 405 of FIG. 4, the function $f_6$ is a function that reports an infrequent URL. For example, the function $f_6$ may implement a procedure to access the log server 115B to mine the proxy logs of a given enterprise. In the example IGG 405 of FIG. 4, the function $f_7$ is a function that indicates whether two endpoint snapshots associated with a device are similar. For example, an endpoint snapshot may correspond to data describing an operating status of an endpoint device, such as the processes running on the device, the processes loaded in memory, the processing accessing memory, network activity, etc. In the example IGG 405 of FIG. 4, the function $f_8$ is a function that outputs an endpoint snapshot associated with an input device. In the example IGG 405 of FIG. 4, the function $f_9$ is a function that outputs a device associated with an input snapshot. In the example IGG 405 of FIG. 4, the function $f_{10}$ is a function that outputs a list of running processes identified in an input snapshot. In the example IGG 405 of FIG. 4, the function $f_{11}$ is a function that identifies a bad process included in an input list of running processes.

Returning to FIG. 2, the cybersecurity investigation tool 105 utilizes an information graph to represent and analyze the investigative data for a given investigation case. The information graph is generated by application of the IGG (e.g., the IGG 405) managed by the information gathering manager 210 to the available information sources 115 according to a graph schema specifying the possible relationships between the functions of the IGG 405. The cybersecurity investigation tool 105 includes the graph schema manager 215 to manage (e.g., create, store, update, delete, etc.) the graph schema. In some examples, the graph schema defines a graphical representation of the set of functions in the IGG 405 such that each vertex v: T of the graph is an instance v of type T The graph schema also defines an edge between two vertices $v_1:T_1$ and $v_2:T_2$ with label l if there is a semantically annotated function (f, l) in the IGG 405 such that f takes an element of type $T_1$ and returns another element of type $T_2$.

Figure 5:
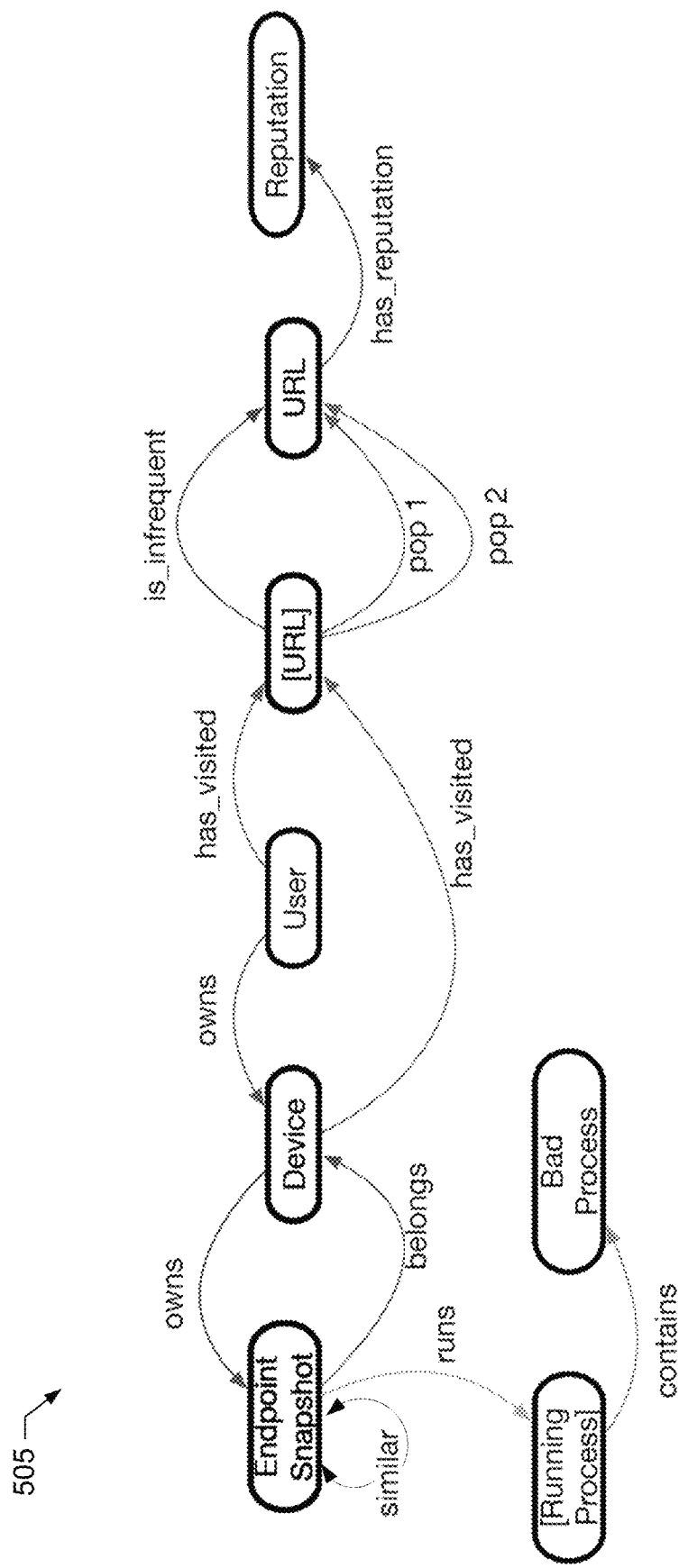
FIG. 5 illustrates an example graph schema specifying possible relationships between the collection of functions illustrated in FIG. 4.

An example graph schema 505 managed by the graph schema manager 215 for the example IGG 405 of FIG. 4 is illustrated in FIG. 5. The example graph schema 505 includes an initial vertex labeled "Device." The "Device" vertex of the graph schema 505 is connected to a vertex labeled "Endpoint Snapshot" according to function $f_8$ of the IGG 405. The "Endpoint Snapshot" vertex of the graph schema 505 is connected to a vertex labeled "[Running Processes]" according to the function $f_{10}$ of the IGG 405. The "[Running Processes]" vertex of the graph schema 505 is connected to a vertex labeled "Bad Process" according to the function $f_{11}$ of the IGG 405.

In the illustrated example, the "Device" vertex of the graph schema 505 is also connected to a vertex labeled "User" according to the function $f_1$ of the IGG 405. The "User" vertex and the "Device" vertex of the graph schema 505 are connected to a vertex labeled "[URL]" according to the function $f_2$ of the IGG 405. The "[URL]" vertex of the graph schema 505 is connected to a vertex labeled "URL" according to the functions $f_4$, $f_5$ and $f_6$ of the IGG 405. The "URL" vertex of the graph schema 505 is connected to a vertex labeled "Reputation" according to the function $f_3$ of the IGG 405.

The example cybersecurity investigation tool 105 of FIG. 3 includes the example graph generator 240 to generate an information graph for a given cybersecurity investigation case by gathering investigative data using the functions of the IGG (e.g., the IGG 405) managed by the information gathering manager 210 and linking the investigative data based on the graph schema (e.g., the graph schema 505) managed by the graph schema manager 215. An example information graph 605 generated by the graph generator 240 based on the IGG 405 and graph schema 505 is illustrated in FIG. 6.

In some examples, the graph generator 240 generates an information graph, such as the information graph 605, beginning with one or more initial vertices corresponding to initial investigative information not obtained through the functions of the IGG, such as the IGG 405. Rather, the investigative data associated with the one or more initial vertices may be obtained from one or more threat alert events detected by the threat alert detector 230 of the cybersecurity investigation tool 105, which result in the investigation being started. For example, the computing devices 110 being monitored by the cybersecurity investigation tool 105 may be configured to report threat alert events to the cybersecurity investigation tool 105 in response to one or more conditions, such as, but not limited to, detection of malware, detection of improper memory accesses by a process, detection of excessive processor utilization by a process, detection of excessive log-in attempts, etc. The threat alert event may identify, for example, the computing device 110 associated with the event. In the example information graph 605, the initial vertex corresponds to the vertex labeled "mac 1" of the type "device," which identifies the device associated with an initial threat alert event detected by the threat alert detector 230.

Then, starting with the set of initial vertices, the graph generator 240 iteratively expands the information graph using the information gathering functions of the IGG, such as the IGG 405. For example, during each graph building iteration, the graph generator 240 invokes the information retriever 235 to execute appropriate functions of the IGG to obtain additional investigative data, which the graph generator 240 uses to generate new vertices representing different pieces of output investigative data obtained by the functions. In some examples, the information retriever 235 selects ones of the IGG functions having inputs corresponding to the new vertices added to the information graph during a prior iteration to represent the new output investigative data obtained by the IGG functions executed in that prior iteration.

Figure 6:
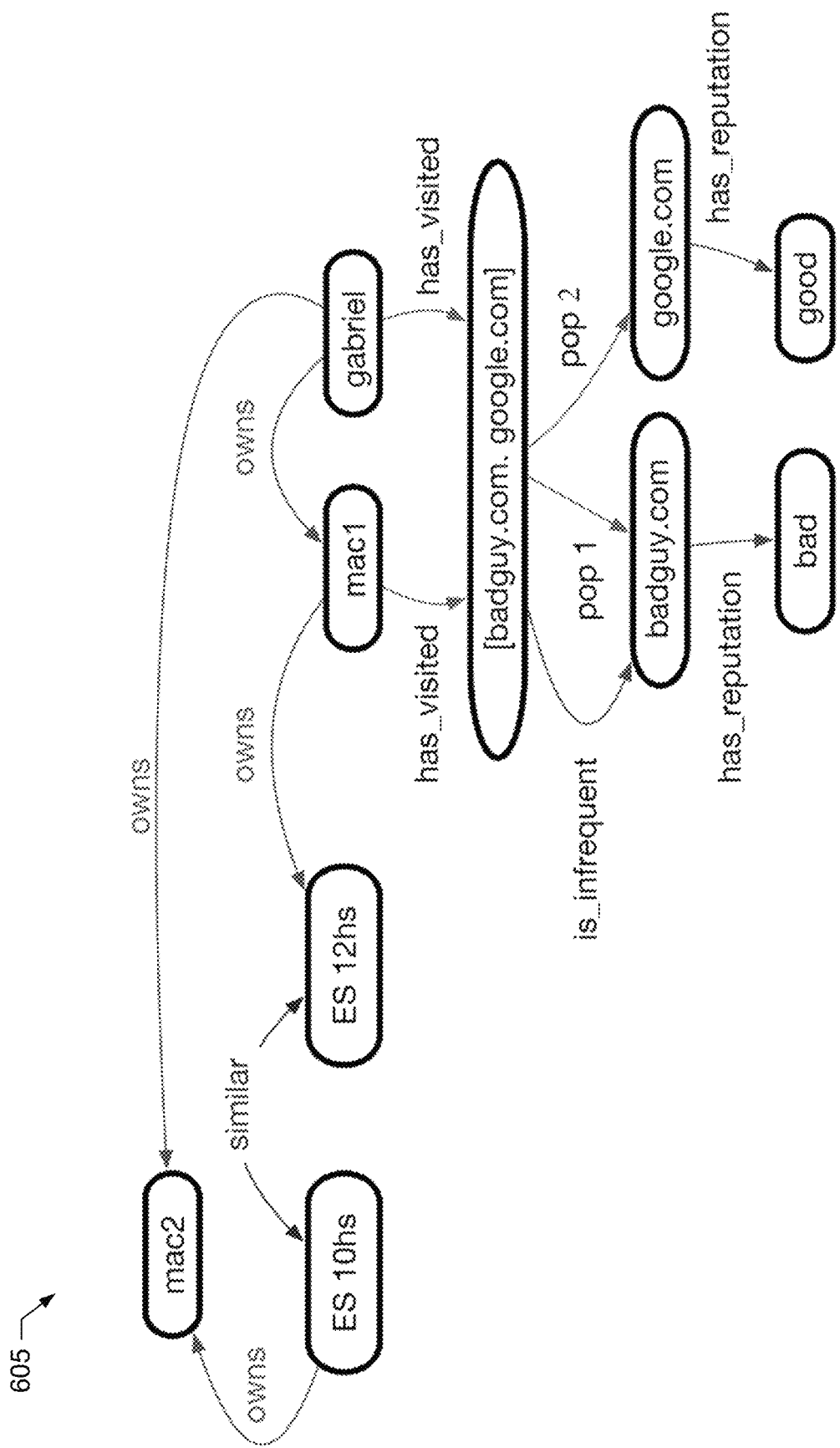
FIG. 6 illustrates an example information graph generated by the cybersecurity investigation tool of FIGS. 1 and/or 2 based on the collection of functions illustrated in FIG. 4 and the graph schema illustrated in FIG. 5.

By way of example, to generate the information graph 605 of FIG. 6, the graph generator 240 invokes the information retriever 235 with the investigative data corresponding to initial vertex "mac 1." The information retriever 235 selects the function $f_1$ to execute because that function accepts data of type "Device" as input. The function $f_1$ obtains output investigative data indicating that "gabriel" is the owner of "mac 1." Thus, the graph generator 240 adds a vertex labeled "gabriel" to the graph 605 and connects the vertices based on the graph schema 505 as shown.

In a next processing iteration, the graph generator 240 invokes the information retriever 235, which selects the function $f_2$ to execute on the data corresponding to the vertices "mac 1" and "gabriel" because that function accepts data of types "Device" and "User" as input. The function $f_2$ obtains output investigative data indicating the list of URLs "[badguy.com and google.com]" were accessed by user "gabriel" using the device "mac 1." Thus, the graph generator 240 adds a vertex labeled "[badguy.com and google.com]" to the graph 605 and connects the vertices based on the graph schema 505 as shown.

In a next processing iteration, the graph generator 240 invokes the information retriever 235, which selects the functions $f_4$, $f_5$ and $f_6$ to execute on the data corresponding to the "[badguy.com and google.com]" vertex because those functions accept a list of URLs as input. The function $f_4$ obtains output investigative data indicating the URL "badguy.com" is the first URL in the input list. The function $f_5$ obtains output investigative data indicating the URL "google.com" is the second URL in the input list. The function $f_6$ obtains output investigative data indicating the URL "badguy.com" is an infrequently visited URL from the input list of URLs. Thus, the graph generator 240 adds a vertex labeled "badguy.com" and a vertex labeled "google.com" to the graph 605, and connects the vertices based on the graph schema 505 as shown.

In a next processing iteration, the graph generator 240 invokes the information retriever 235, which selects the function $f_3$ to execute on the "badguy.com" and "google.com" vertices because that function accepts a URL as input. For the "badguy.com" vertex, the function $f_3$ obtains output investigative data indicating the URL "badguy.com" has a "bad" reputation. For the "google.com" vertex, the function $f_3$ obtains output investigative data indicating the URL "google.com" has a "good" reputation. Thus, the graph generator 240 adds a vertex labeled "bad" and a vertex labeled "good" to the graph 605, and connects the vertices based on the graph schema 505 as shown.

In the illustrated example of FIG. 6, the vertex labeled "mac 2" also corresponds to an initial vertex obtained from a detected threat alert event. In a processing iteration corresponding to when the event is detected, the graph generator 240 invokes the information retriever 235 based on the "mac 2" vertex. The information retriever 235 selects the function $f_1$ to execute because that function accepts data of type "Device" as input. The function $f_1$ obtains output investigative data indicating that "gabriel" is the owner of "mac 2." Because the vertex labeled "gabriel" is already in the graph 605, the graph generator 240 just connects that vertex to the other vertices based on the graph schema 505 as shown.

In a next processing iteration, the graph generator 240 invokes the information retriever 235, which selects the function $f_8$ to execute on the data corresponding to the vertices "mac 1" and "mac 2" because that function accepts data of type "Device" as input. For the "mac 1" vertex, the function $f_8$ obtains output investigative data corresponding to an endpoint snapshot labeled "ES 12hs" for that device. For the "mac 2" vertex, the function $f_8$ obtains output investigative data corresponding to an endpoint snapshot labeled "ES 10hs" for that device. Thus, the graph generator 240 adds a vertex labeled "ES 12hs" and a vertex labeled "ES 10hs" to the graph 605, and connects the vertices based on the graph schema 505 as shown.

In a next processing iteration, the graph generator 240 invokes the information retriever 235, which selects the function $f_7$ to execute on the data corresponding to the vertices "ES 12hs" and "ES 10hs." The function $f_7$ obtains output investigative data indicating the endpoint snapshots "ES 12hs" and "ES 10hs" are similar. Thus, the graph generator 240 and connects those vertices based on the graph schema 505 as shown.

Figure 7:
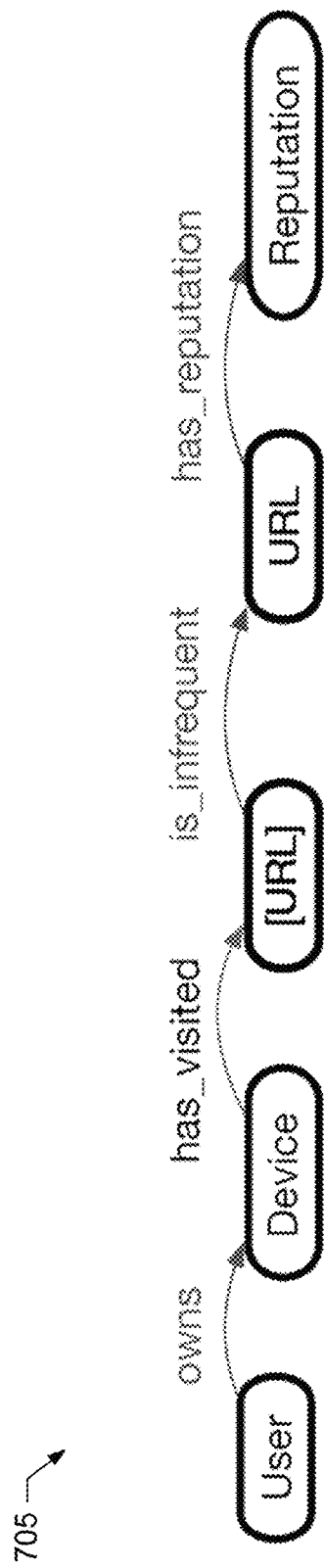
FIG. 7 illustrates an example pattern in the graph schema of FIG. 5 that corresponds to a cybersecurity threat.
Figure 8:
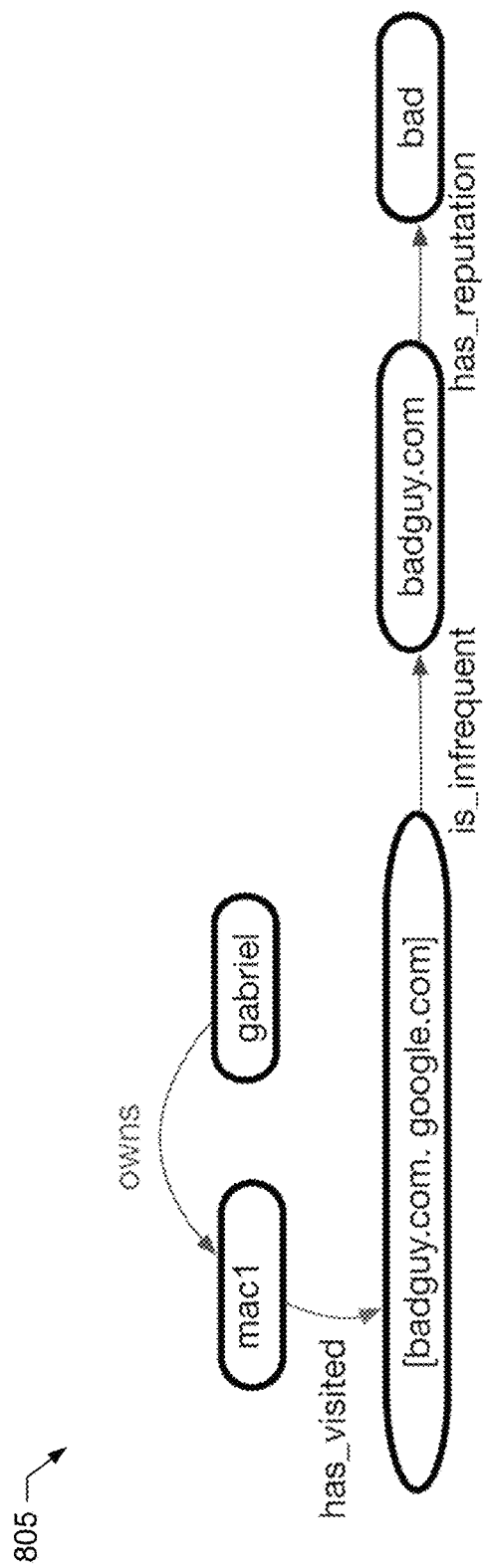
FIG. 8 illustrates an example path in the information graph of FIG. 6 that matches the example schema pattern of FIG. 7

The cybersecurity investigation tool 105 includes the pattern recognizer 245 to traverse the information graph (e.g., the graph 605) generated by the graph generator 240 to find paths in the graph that match activity reference patterns of interest. Such patterns may represent evidence of an attack or otherwise act as leads to help uncover attack intent and/or activity. The cybersecurity investigation tool 105 includes the reference pattern manager 220 to manage (e.g., create, store, update, delete, etc.) reference patterns to be searched for by the pattern recognizer 245. In the illustrated example, the reference patterns are described as paths in the graph schema managed by the graph schema manager 215. For example, FIG. 7 illustrates an example reference pattern 705 specified from the example schema 505, and FIG. 8 illustrates a corresponding example path 805 in the example information graph 605 found by the pattern recognizer 245 to match the reference pattern 705.

The cybersecurity investigation tool 105 includes the investigation logger 225 to log the results of an investigation. For example, the investigation logger 225 may log each iteration of the information graph built by the graph generator 240 to document how the investigation unfolded. Additionally or alternatively, the investigation logger 225 may log any path(s) in the information graph found by the pattern recognizer 245 to match corresponding reference pattern(s) of the graph schema (e.g., which correspond to possible threats).

The cybersecurity investigation tool 105 includes the user interface 250 to present a user interface on the workstation 125. In some examples, the user interface 250 outputs the information graph generated by the graph generator 240 (and/or one or more earlier iterations) and any path(s) in the information graph found by the pattern recognizer 245 to match corresponding reference patterns of the graph schema. For example, the user interface 250 may present such information as one or more graphs on a display of the workstation 125. In some examples, the user interface 250 provides an interface to accept inputs from the workstation 125 to, for example, adjust the operations performed by the cybersecurity investigation tool 105. For example, during each iteration of building the information graph, the user interface 250 may accept inputs specifying one or more functions of the IGG to be executed.

In some examples, the elements of the cybersecurity investigation tool 105 cooperate to perform a cybersecurity investigation as follows. Functions to implement an IGG are developed (e.g., coded) and maintained by the information gathering manager 210. In some examples, the IGG models artifacts, activities, and relationships relevant to adversary tools, tactics, and procedures (TTPs) over an enterprise domain. A new threat investigation is triggered by a threat alert event detected by the threat alert detector 230, and the graph generator 240 generates an initial vertex from the alert data that is used to create an investigation case. The graph generator 240 then builds the information graph corresponding the investigation case by invoking the information retriever 235 to gather investigative data using the functions of the IGG. The graph generator 240 creates vertices corresponding to the new obtained data output from the functions, and links the data by linking the vertices in accordance with the graph schema maintained by the graph schema manager 215. Much of this process is automated. For example, some common functions may be applied by default to the investigation case. Other functions can be applied conditionally and iteratively based on the current context of the investigation (e.g., as captured by the partially constructed graph). Such conditional application of IGG functions can be triggered manually by input from a human analyst (e.g., received via the user interface 250) and/or by machine intelligence (e.g., trained by observation of analyst actions).

In some examples, known attack techniques and steps can be translated into reference patterns in the graph schema, which are stored and maintained by the reference pattern manager 220 (e.g., as a knowledge base). The pattern recognizer 245 automatically searches for such reference paths in the information graph generated by the graph generator 240. In some examples, the pattern recognizer 245 can selectively apply IGG functions to complete partial patterns recognized in the information graph. Such selective, rather than arbitrary, expansion of the information graph can lead to expertly progressing the investigation. The pattern recognizer 245 can also draw inferences (driven by a knowledge base). Such inferences can also be modeled as semantically annotated functions, and be used to annotate the information graph. Such inferences may (either probabilistically or definitively) interpret specific activity (corresponding to matched patterns in the information graph) as attack techniques, and/or glean attacker intent, and/or draw other relevant insights, and/or devise hypotheses. In some examples, human analysts can collaborate with the cybersecurity investigation tool 105 in developing the information graph. For example, analysts can guide the investigation (via inputs received from the workstation 125 with the user interfaced 250) by triggering a selected IGG function to expand the graph, and/or by manually adding data to the information graph. In some examples, analysts can increase or decrease the confidence score for certain probabilistic machine inferences, and/or dismiss inferences that are deemed erroneous (e.g., via the workstation 125 and user interface 250). In some examples, analysts can direct (e.g., via the workstation 125 and user interface 250) the cybersecurity investigation tool 105 to search for (and/or prioritize) selected known attack patterns based on the analysts' unique understanding of the case. In some examples, analysts can annotate (e.g., via the workstation 125 and user interface 250) the information graph based on their own insights, such as by filling in gaps where the cybersecurity investigation tool 105 lacked investigative data. The cybersecurity investigation tool 105, in turn, can use such confirmations and/or annotations to match additional (e.g., newly evident) reference patterns, and further advance the investigation automatically.

In some examples, the investigation logger 225 records the iterative cycle of each threat investigation, including one or more of the different iterative versions of the graph generated by the graph generator 240, the contextual decisions and insights entered by an analyst during different iterations, etc., in a machine-readable fashion. Such logged data can be analyzed to draw further insights into attack patterns and the next-best-step decisions in the investigation, thereby leading to improved machine intelligence.

As such, the cybersecurity investigation tool 105 supports the iterative cycle central to a threat investigation, namely, the cycle of gathering and linking relevant information, drawing inferences, and using them to make further decisions. The cybersecurity investigation tool 105 facilitates human-machine teaming on information and insights, which may range from a fine-grained tactical level to a broad, strategic level. In some examples, the cybersecurity investigation tool 105 automatically performs machine computations so long as they as they are associated with high confidence (e.g., satisfying one or more thresholds), and defers decisions to an analyst in cases of lower confidence (e.g., not satisfying one or more thresholds).

While an example manner of implementing the cybersecurity investigation tool 105 is illustrated in FIGS. 1-8, one or more of the elements, processes and/or devices illustrated in FIGS. 1-8 may be combined, divided, re-arranged, omitted, eliminated and/or implemented in any other way. Further, the example network interface 205, the example information gathering manager 210, the example graph schema manager 215, the example reference pattern manager 220, the example investigation logger 225, the example threat alert detector 230, the example information retriever 235, the example graph generator 240, the example pattern recognizer 245, the example user interface 250 and/or, more generally, the example cybersecurity investigation tool 105 may be implemented by hardware, software, firmware and/or any combination of hardware, software and/or firmware. Thus, for example, any of the example network interface 205, the example information gathering manager 210, the example graph schema manager 215, the example reference pattern manager 220, the example investigation logger 225, the example threat alert detector 230, the example information retriever 235, the example graph generator 240, the example pattern recognizer 245, the example user interface 250 and/or, more generally, the example cybersecurity investigation tool 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example cybersecurity investigation tool 105, the example network interface 205, the example information gathering manager 210, the example graph schema manager 215, the example reference pattern manager 220, the example investigation logger 225, the example threat alert detector 230, the example information retriever 235, the example graph generator 240, the example pattern recognizer 245 and/or the example user interface 250 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cybersecurity investigation tool 105 may include one or more elements, processes and/or devices in addition to, or instead of, those illustrated in FIGS. 1-8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
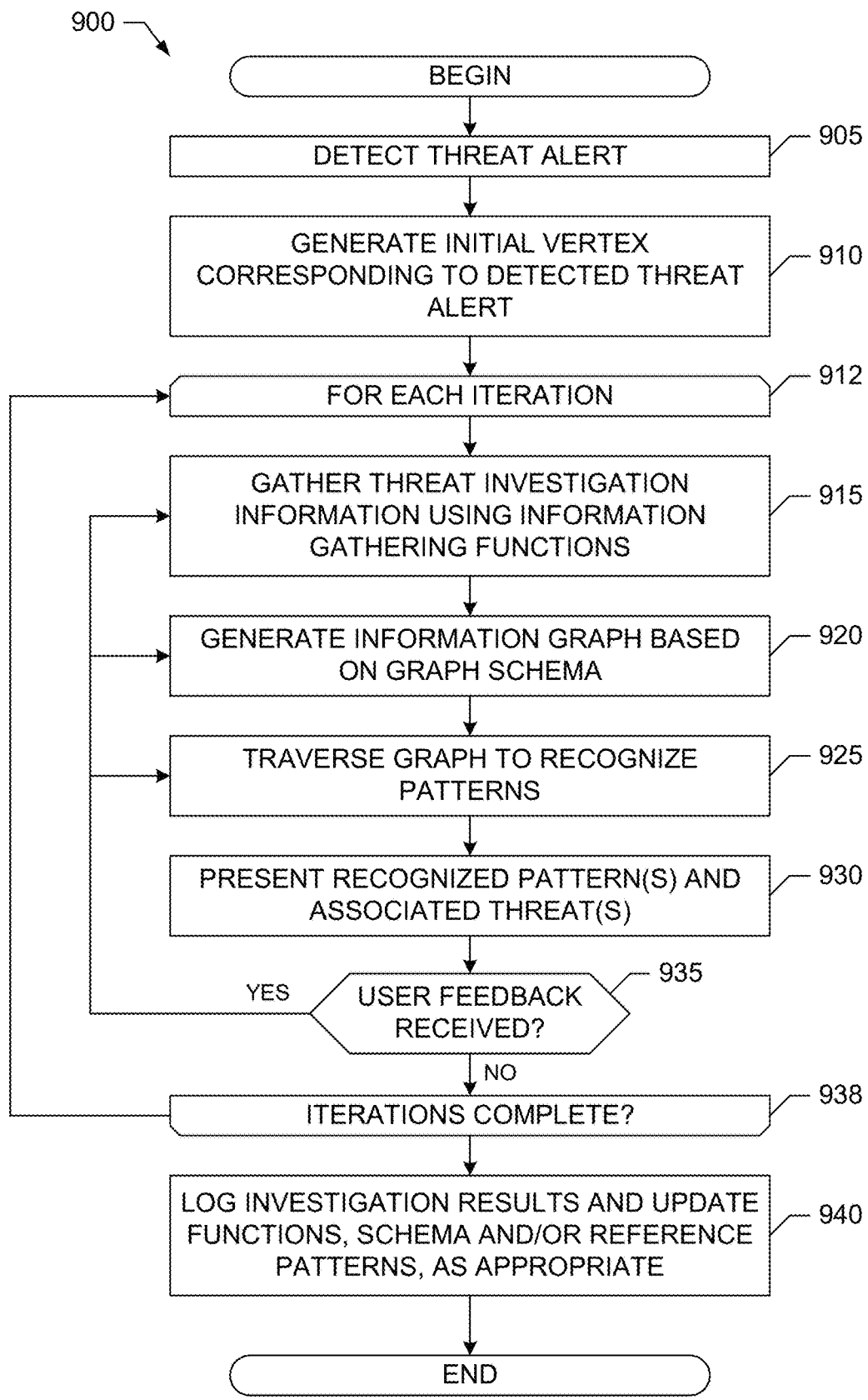
FIG. 9 is a flowchart representative of example computer readable instructions that may be executed to implement the example cybersecurity investigation tool of FIGS. 1 and/or 2.

A flowchart representative of example hardware logic, machine readable instructions, hardware implemented state machines, and/or any combination thereof for implementing the example cybersecurity investigation tool 105 is shown in FIG. 9. In this example, the machine readable instructions may be one or more executable programs or portion(s) thereof for execution by a computer processor, such as the processor 1012 shown in the example processor platform 1000 discussed below in connection with FIG. 10. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processor 1012, but the entire program or programs and/or parts thereof could alternatively be executed by a device other than the processor 1012, and/or embodied in firmware or dedicated hardware. Further, although the example program(s) is(are) described with reference to the flowchart illustrated in FIG. 9, many other methods of implementing the example cybersecurity investigation tool 105 may alternatively be used. For example, with reference to the flowchart illustrated in FIG. 9, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

An example program 900 that may be executed to implement the example cybersecurity investigation tool 105 is illustrated in FIG. 9. With reference to the preceding figures and corresponding written descriptions, execution of the example program 900 begins at block 905 at which threat alert detector 230 detect (via the network interface 205) a threat alert event from one of the monitored computing devices 110, as described above. At block 910, the graph generator 240 generates an initial vertex of an information graph based on data associated with the detected alert event, as described above. At block 912, the cybersecurity investigation tool 105 begins a next processing iteration to generate a next version of the information graph to be analyzed. At block 915, the information retriever 235 executes, as described above, functions managed by the information gathering manager 210 to obtain investigative data associated with the cybersecurity investigation being performed by the cybersecurity investigation tool 105. At block 920, the graph generator 240 generates a version iteration of the information graph based on the investigative data obtained at block 915 and the graph schema managed by the graph schema manager 215. At block 925, the example pattern recognizer 245 traverses, as described above, the new version of the information graph generated at block 920 to find path(s) that match reference pattern(s) managed by the reference pattern manager 220. At block 930, the user interface 250 presents any recognized patterns found in the information graph at block 925, as well as the threat(s) associated with the presented pattern(s). At block 935, if user input is received via the user interface 250, processing at one or more of blocks 915, 920 and/or 925 is adjusted accordingly, as described above. At block 938, the cybersecurity investigation tool 105 determines whether iterative processing is complete. If iterative processing is complete, at block 940 the investigation logger 225 logs, as described above, the results of the investigation. Additionally or alternatively, the investigation logger 225 updates the functions managed by the information gathering manager 210, the graph schema managed by the graph schema manager 215 and/or the reference pattern managed by the reference pattern manager 220 based on the results of the current investigation.

Figure 10:
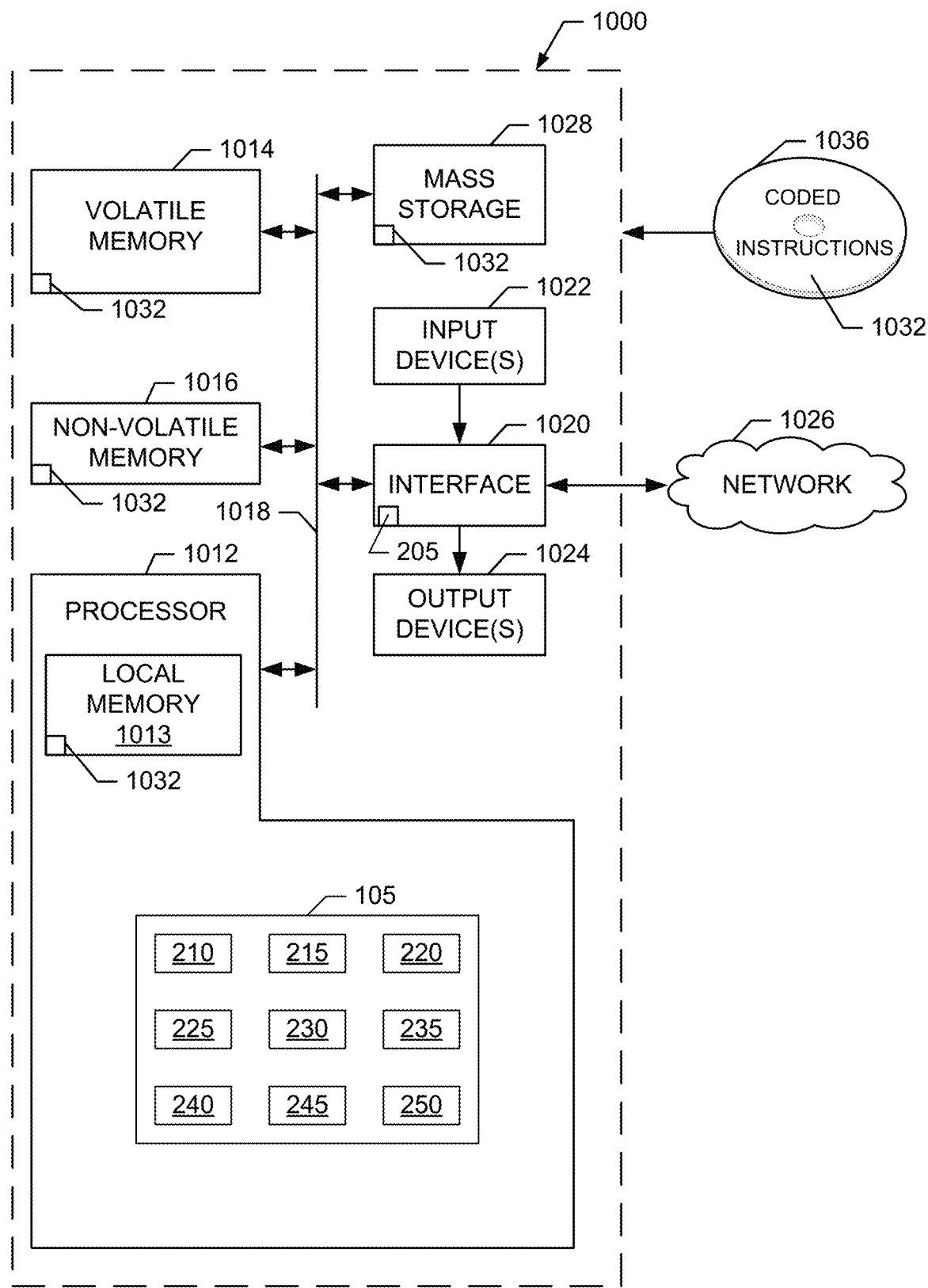
FIG. 10 is a block diagram of an example processor platform structured to execute the example computer readable instructions of FIG. 9 to implement the example cybersecurity investigation tool of FIGS. 1 and/or 2.

FIG. 10 is a block diagram of an example processor platform 1000 structured to execute the instructions of FIG. 9 to implement the example cybersecurity investigation tool 105. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the example information gathering manager 210, the example graph schema manager 215, the example reference pattern manager 220, the example investigation logger 225, the example threat alert detector 230, the example information retriever 235, the example graph generator 240, the example pattern recognizer 245 and/or the example user interface 250.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc. The interface circuit 1020 also implements the example network interface 205.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 corresponding to the instructions of FIGS. 6 and/or 7 may be stored in the mass storage device 1028, in the volatile memory 1014, in the non-volatile memory 1016, in the local memory 1013 and/or on a removable non-transitory computer readable storage medium, such as a CD or DVD 1036.

Figure 11:
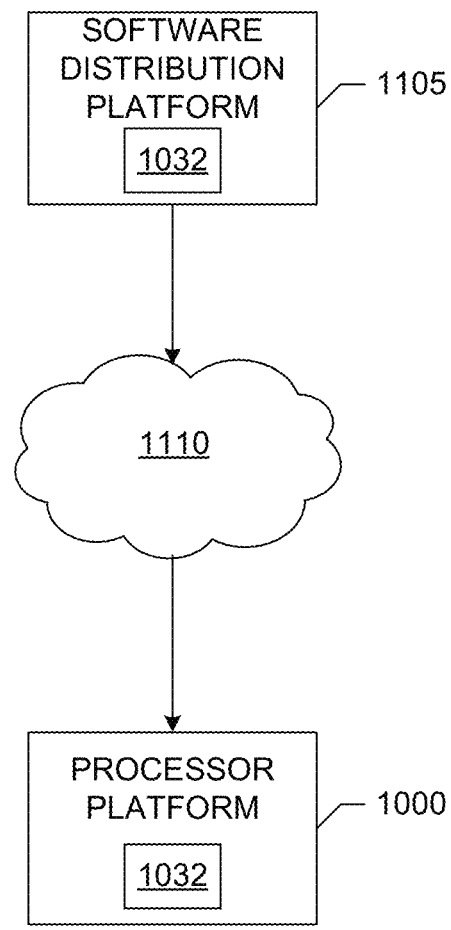
FIG. 11 is a block diagram of an example software distribution platform to distribute software corresponding to the example computer readable instructions of FIG. 9 to the example processor platform of FIG. 10 to implement the example cybersecurity investigation tool of FIGS. 1 and/or 2.

A block diagram illustrating an example software distribution platform 1105 to distribute software corresponding to the example computer readable instructions 1032 to the example processor platform 1000 of FIG. 10 to implement the example cybersecurity investigation tool 105 is illustrated in FIG. 11. In the illustrated example, the software distribution platform 1105 is to store the computer readable instructions 1032, which may correspond to the example computer readable instructions 900 of FIG. 9, as described above. The example software distribution platform 1105 is in communication with the example processor platform 1000 via an example network 1110, which may correspond to any one or more of the example networks 120 and/or 1026 described above. This enables the software distribution platform 1105 to download the computer readable instructions 1032, which may correspond to the example computer readable instructions 900 of FIG. 9, to the example processor platform 1000, which is to execute the computer readable instructions 1032 to implement the cybersecurity investigation tool 105. As such, the example processor platform 1100 may be implemented by any computer server, data facility, cloud service, etc., capable of storing and downloading software to other computing devices.

The foregoing disclosure provides example methods, apparatus and articles of manufacture to implement cybersecurity investigation tools utilizing information graphs. The following further examples are disclosed herein. The disclosed examples can be implemented individually and/or in one or more combinations.

Example 1 is a non-transitory computer readable medium including computer readable instructions which, when executed, cause at least one processor to at least: (1) iteratively generate an information graph based on investigative data in response to detection of a threat alert in a monitored network, the investigative data accessed from information sources based on a set of information seeker tools, the information graph generated based on a graph schema specifying possible relationships between the information seeker tools; (2) traverse the information graph to identify a path in the information graph matching a pattern from the graph schema associated with a cybersecurity threat; and (3) output the path identified in the information graph and the cybersecurity threat to an output device.

Example 2 includes the subject matter of example 1, wherein respective ones of the information seeker tools specify input-output relationships between inputs and outputs of the respective ones of the information seeker tools, and the respective ones of the information seeker tools specify procedures to access the information sources to obtain output investigative data satisfying the input-output relationships specified by the respective ones of the information seeker tools for input investigative data applied to the respective ones of the information seeker tools.

Example 3 includes the subject matter of example 2, wherein the information sources include at least one of a reputation service, a log server or a threat intelligence knowledge database, and the respective ones of the information seeker tools specify respective procedures for accessing the at least one of the reputation service, the log server or the threat intelligence knowledge database to obtain the output investigative data satisfying the input-output relationships specified by the respective ones of the information seeker tools for the input data.

Example 4 includes the subject matter of example 2 or example 3, wherein the information graph includes vertices corresponding to the investigative data and links identifying the input-output relationships between the investigative data corresponding to the vertices, and to generate the information graph, the instructions are to cause the at least one processor to: (1) beginning with an initial vertex corresponding to first input investigative data associated with the detected threat alert, obtain respective first output investigative data for ones of a first subset of information seeker tools having respective inputs corresponding to the first investigative data, the respective first output investigative data to be obtained based on the procedures specified by the ones of the first subset of information seeker tools; and (2) connect, based on the graph schema, the initial vertex corresponding to the first input investigative data to respective first output vertices corresponding to the respective first output investigative data obtained for the ones of the first subset of information seeker tools to generate a first iteration of the information graph, the initial vertex and the respective first output vertices to be connected with first links identifying the input-output relationships specified by the ones of the first subset of information seeker tools to relate the initial vertex to the respective first output vertices.

Example 5 includes the subject matter of example 4, wherein the instructions are to cause the at least one processor to: (1) obtain respective second output investigative data for ones of a second subset of information seeker tools having respective inputs corresponding to the respective first output investigative data, the respective second output investigative data to be obtained based on the procedures specified by the ones of the second subset of information seeker tools; and (2) connect, based on the graph schema, the respective first output vertices to respective second output vertices corresponding to the respective second output investigative data obtained for the ones of the second subset of information seeker tools to generate a second iteration of the information graph, the respective first output vertices and the respective second output vertices to be connected with second links identifying the input-output relationships specified by the ones of the second subset of information seeker tools to relate the initial vertex to the respective first output vertices.

Example 6 includes the subject matter of example 5, wherein the path is a first path, and the instructions are to cause the at least one processor to: (1) traverse the second iteration of the information graph to identify a second path matching a portion of the pattern from the graph schema; (2) in response to identification of the information path, select one of the information seeker tools capable of expanding the second path to form the first path matching the pattern from the graph schema; (3) obtain third output investigative data based on the selected one of the information seeker tools; (4) connect, based on the graph schema, a third output vertex to the second iteration of the information graph, the third output vertex corresponding to the third output investigative data obtained based on the selected one of the information seeker tools to generate a third iteration of the information graph; and (5) determine whether the third output vertex expanded the second path to form the first path.

Example 7 includes the subject matter of any one of examples 1 to 6, wherein the computer readable instructions, when executed, further cause the at least one processor to: (1) log respective iterations of the information graph in a computer accessible format; and (2) output one or more of the logged iterations of the information graph in response to a request.

Example 8 is an apparatus to perform a cybersecurity investigation, the apparatus including a graph generator to iteratively generate an information graph based on investigative data in response to detection of a threat alert in a monitored network, the investigative data accessed from information sources based on a set of information seeker tools, the information graph generated based on a graph schema specifying possible relationships between the information seeker tools. The apparatus of example 8 also includes a pattern recognizer to traverse the information graph to identify a path in the information graph matching a pattern from the graph schema associated with a cybersecurity threat. The apparatus of example 8 further includes a user interface to output the path identified in the information graph and the cybersecurity threat to an output device.

Example 9 includes the subject matter of example 8, wherein respective ones of the information seeker tools specify input-output relationships between inputs and outputs of the respective ones of the information seeker tools, and the respective ones of the information seeker tools specify procedures to access the information sources to obtain output investigative data satisfying the input-output relationships specified by the respective ones of the information seeker tools for input investigative data applied to the respective ones of the information seeker tools.

Example 10 includes the subject matter of example 9, wherein the information sources include at least one of a reputation service, a log server or a threat intelligence knowledge database, and the respective ones of the information seeker tools specify respective procedures for accessing the at least one of the reputation service, the log server or the threat intelligence knowledge database to obtain the output data satisfying the input-output relationships specified by the respective ones of the information seeker tools for the input data.

Example 11 includes the subject matter of example 9 or example 10, wherein the information graph includes vertices corresponding to the investigative data and links identifying the input-output relationships between the investigative data corresponding to the vertices, and the graph generator is to: (1) beginning with an initial vertex corresponding to first input investigative data associated with the detected threat alert, obtain respective first output investigative data for ones of a first subset of information seeker tools having respective inputs corresponding to the first investigative data, the respective first output investigative data to be obtained based on the procedures specified by the ones of the first subset of information seeker tools; and (2) connect, based on the graph schema, the initial vertex corresponding to the first input investigative data to respective first output vertices corresponding to the respective first output investigative data obtained for the ones of the first subset of information seeker tools to generate a first iteration of the information graph, the initial vertex and the respective first output vertices to be connected with first links identifying the input-output relationships specified by the ones of the first subset of information seeker tools to relate the initial vertex to the respective first output vertices.

Example 12 includes the subject matter of example 11, wherein the graph generator is to: (1) obtain respective second output investigative data for ones of a second subset of information seeker tools having respective inputs corresponding to the respective first output investigative data, the respective second output investigative data to be obtained based on the procedures specified by the ones of the second subset of information seeker tools; and (2) connect, based on the graph schema, the respective first output vertices to respective second output vertices corresponding to the respective second output investigative data obtained for the ones of the second subset of information seeker tools to generate a second iteration of the information graph, the respective first output vertices and the respective second output vertices to be connected with second links identifying the input-output relationships specified by the ones of the second subset of information seeker tools to relate the initial vertex to the respective first output vertices.

Example 13 includes the subject matter of example 12, wherein: (1) the pattern recognizer is to traverse the second iteration of the information graph to identify a second path matching a portion of the pattern from the graph schema; (2) the graph generator is to: (A) in response to identification of the information path, select one of the information seeker tools capable of expanding the second path to form the first path matching the pattern from the graph schema; (B) obtain third output investigative data based on the selected one of the information seeker tools; and (C) connect, based on the graph schema, a third output vertex to the second iteration of the information graph, the third output vertex corresponding to the third output investigative data obtained based on the selected one of the information seeker tools to generate a third iteration of the information graph; and (3) the pattern recognizer is to determine whether the third output vertex expanded the second path to form the first path.

Example 14 includes the subject matter of any one of examples 8 to 13, and further includes information logger to log respective iterations of the information graph in a computer accessible format, and the user interface is to output one or more of the logged iterations of the information graph in response to a request.

Example 15 is a method to perform a cybersecurity investigation, the method including iteratively generating, by executing an instruction with at least one processor, an information graph based on investigative data in response to detection of a threat alert in a monitored network, the investigative data accessed from information sources based on a set of information seeker tools, the information graph generated based on a graph schema specifying possible relationships between the information seeker tools. The method of example 15 also includes traversing, by executing an instruction with the at least one processor, the information graph to identify a path in the information graph matching a pattern from the graph schema associated with a cybersecurity threat. The method of example 15 further includes outputting, by executing an instruction with the at least one processor, the path identified in the information graph and the cybersecurity threat to an output device.

Example 16 includes the subject matter of example 15, wherein respective ones of the information seeker tools specify input-output relationships between inputs and outputs of the respective ones of the information seeker tools, and the respective ones of the information seeker tools specify procedures to access the information sources to obtain output investigative data satisfying the input-output relationships specified by the respective ones of the information seeker tools for input investigative data applied to the respective ones of the information seeker tools.

Example 17 includes the subject matter of example 16, wherein the information sources include at least one of a reputation service, a log server or a threat intelligence knowledge database, and the respective ones of the information seeker tools specify respective procedures for accessing the at least one of the reputation service, the log server or the threat intelligence knowledge database to obtain the output data satisfying the input-output relationships specified by the respective ones of the information seeker tools for the input data.

Example 18 includes the subject matter of example 16 or example 17, wherein the information graph includes vertices corresponding to the investigative data and links identifying the input-output relationships between the investigative data corresponding to the vertices, and the generating of the information graph includes: (1) beginning with an initial vertex corresponding to first input investigative data associated with the detected threat alert, obtaining respective first output investigative data for ones of a first subset of information seeker tools having respective inputs corresponding to the first investigative data, the respective first output investigative data to be obtained based on the procedures specified by the ones of the first subset of information seeker tools; and (2) connecting, based on the graph schema, the initial vertex corresponding to the first input investigative data to respective first output vertices corresponding to the respective first output investigative data obtained for the ones of the first subset of information seeker tools to generate a first iteration of the information graph, the initial vertex and the respective first output vertices to be connected with first links identifying the input-output relationships specified by the ones of the first subset of information seeker tools to relate the initial vertex to the respective first output vertices.

Example 19 includes the subject matter of example 18, wherein the generating of the information graph further includes: (1) obtaining respective second output investigative data for ones of a second subset of information seeker tools having respective inputs corresponding to the respective first output investigative data, the respective second output investigative data to be obtained based on the procedures specified by the ones of the second subset of information seeker tools; and (2) connecting, based on the graph schema, the respective first output vertices to respective second output vertices corresponding to the respective second output investigative data obtained for the ones of the second subset of information seeker tools to generate a second iteration of the information graph, the respective first output vertices and the respective second output vertices to be connected with second links identifying the input-output relationships specified by the ones of the second subset of information seeker tools to relate the initial vertex to the respective first output vertices.

Example 20 includes the subject matter of example 19, wherein the path is a first path, and the generating of the information graph includes: (1) traversing the second iteration of the information graph to identify a second path matching a portion of the pattern from the graph schema; (2) in response to identification of the information path, selecting one of the information seeker tools capable of expanding the second path to form the first path matching the pattern from the graph schema; (3) obtaining third output investigative data based on the selected one of the information seeker tools; (4) connecting, based on the graph schema, a third output vertex to the second iteration of the information graph, the third output vertex corresponding to the third output investigative data obtained based on the selected one of the information seeker tools to generate a third iteration of the information graph; and (5) determining whether the third output vertex expanded the second path to form the first path.

Example 21 includes the subject matter of any one of examples 15 to 20, and further includes: logging respective iterations of the information graph in a computer accessible format; and outputting one or more of the logged iterations of the information graph in response to a request.

From the foregoing, it will be appreciated that example methods, apparatus and articles of manufacture have been disclosed that implement cybersecurity investigation tools utilizing information graphs. The disclosed methods, apparatus and articles of manufacture improve the efficiency of using a computing device by employing novel information gathering functions and a corresponding graph schema to iteratively obtain investigative data relevant to a detected cybersecurity alert event, and link the investigative data in a graph that documents the relationships between the data. The disclosed methods, apparatus and articles of manufacture utilize graph traversal and pattern matching to quickly identify paths in the graph that are associated with possible threats, thereby reducing the time needed to detect and mitigate a cybersecurity threat. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable medium comprising computer readable instructions which, when executed, cause at least one processor to at least:
    iteratively generate an information graph based on investigative data in response to detection of a threat alert in a monitored network, the investigative data accessed from information sources based on a set of information seeker tools, respective ones of the information seeker tools to specify input-output relationships between inputs and outputs of the respective ones of the information seeker tools, the respective ones of the information seeker tools to specify procedures to access the information sources to obtain output investigative data satisfying the input-output relationships specified by the respective ones of the information seeker tools for input investigative data applied to the respective ones of the information seeker tools, the information graph generated based on a graph schema specifying possible relationships between the information seeker tools, the information graph including vertices corresponding to the investigative data and links identifying the input-output relationships between the investigative data corresponding to the vertices, and to generate the information graph, the instructions cause the at least one processor to:
        beginning with an initial vertex corresponding to first input investigative data associated with the detected threat alert, obtain respective first output investigative data for ones of a first subset of information seeker tools having respective inputs corresponding to the first investigative data, the respective first output investigative data to be obtained based on the procedures specified by the ones of the first subset of information seeker tools; and
        connect, based on the graph schema, the initial vertex corresponding to the first input investigative data to respective first output vertices corresponding to the respective first output investigative data obtained for the ones of the first subset of information seeker tools to generate a first iteration of the information graph, the initial vertex and the respective first output vertices to be connected with first links identifying the input-output relationships specified by the ones of the first subset of information seeker tools to relate the initial vertex to the respective first output vertices;
    traverse the information graph to identify a path in the information graph matching a pattern from the graph schema associated with a cybersecurity threat; and
    output the path identified in the information graph and the cybersecurity threat to an output device.

2. The non-transitory computer readable medium of claim 1, wherein the information sources include at least one of a reputation service, a log server or a threat intelligence knowledge database, and the respective ones of the information seeker tools specify respective procedures for accessing the at least one of the reputation service, the log server or the threat intelligence knowledge database to obtain the output investigative data satisfying the input-output relationships specified by the respective ones of the information seeker tools for the input data.

3. The non-transitory computer readable medium of claim 1, wherein the instructions cause the at least one processor to:
    obtain respective second output investigative data for ones of a second subset of information seeker tools having respective inputs corresponding to the respective first output investigative data, the respective second output investigative data to be obtained based on the procedures specified by the ones of the second subset of information seeker tools; and
    connect, based on the graph schema, the respective first output vertices to respective second output vertices corresponding to the respective second output investigative data obtained for the ones of the second subset of information seeker tools to generate a second iteration of the information graph, the respective first output vertices and the respective second output vertices to be connected with second links identifying the input-output relationships specified by the ones of the second subset of information seeker tools to relate the initial vertex to the respective first output vertices.

4. The non-transitory computer readable medium of claim 3, wherein the path is a first path, and the instructions cause the at least one processor to:
traverse the second iteration of the information graph to identify a second path matching a portion of the pattern from the graph schema;
in response to identification of the information path, select one of the information seeker tools capable of expanding the second path to form the first path matching the pattern from the graph schema;
obtain third output investigative data based on the selected one of the information seeker tools;
connect, based on the graph schema, a third output vertex to the second iteration of the information graph, the third output vertex corresponding to the third output investigative data obtained based on the selected one of the information seeker tools to generate a third iteration of the information graph; and
determine whether the third output vertex expanded the second path to form the first path.

5. The non-transitory computer readable medium of claim 1, wherein the instructions cause the at least one processor to:
log respective iterations of the information graph in a computer accessible format; and
output one or more of the logged iterations of the information graph in response to a request.

6. An apparatus to perform a cybersecurity investigation, the apparatus comprising:
a graph generator to iteratively generate an information graph based on investigative data in response to detection of a threat alert in a monitored network, the investigative data accessed from information sources based on a set of information seeker tools, respective ones of the information seeker tools to specify input-output relationships between inputs and outputs of the respective ones of the information seeker tools, the respective ones of the information seeker tools to specify procedures to access the information sources to obtain output investigative data satisfying the input-output relationships specified by the respective ones of the information seeker tools for input investigative data applied to the respective ones of the information seeker tools, the information graph generated based on a graph schema specifying possible relationships between the information seeker tools, the information graph including vertices corresponding to the investigative data and links identifying the input-output relationships between the investigative data corresponding to the vertices, and the graph generator is to:
beginning with an initial vertex corresponding to first input investigative data associated with the detected threat alert, obtain respective first output investigative data for ones of a first subset of information seeker tools having respective inputs corresponding to the first investigative data, the respective first output investigative data to be obtained based on the procedures specified by the ones of the first subset of information seeker tools; and
connect, based on the graph schema, the initial vertex corresponding to the first input investigative data to respective first output vertices corresponding to the respective first output investigative data obtained for the ones of the first subset of information seeker tools to generate a first iteration of the information graph, the initial vertex and the respective first output vertices to be connected with first links identifying the input-output relationships specified by the ones of the first subset of information seeker tools to relate the initial vertex to the respective first output vertices;
a pattern recognizer to traverse the information graph to identify a path in the information graph matching a pattern from the graph schema associated with a cybersecurity threat; and
a user interface to output the path identified in the information graph and the cybersecurity threat to an output device, at least one of the graph generator, the pattern recognizer or the user interface implemented by hardware or processor circuitry.

7. The apparatus of claim 6, wherein the information sources include at least one of a reputation service, a log server or a threat intelligence knowledge database, and the respective ones of the information seeker tools specify respective procedures for accessing the at least one of the reputation service, the log server or the threat intelligence knowledge database to obtain the output data satisfying the input-output relationships specified by the respective ones of the information seeker tools for the input data.

8. The apparatus of claim 6, wherein the graph generator is to:
obtain respective second output investigative data for ones of a second subset of information seeker tools having respective inputs corresponding to the respective first output investigative data, the respective second output investigative data to be obtained based on the procedures specified by the ones of the second subset of information seeker tools; and
connect, based on the graph schema, the respective first output vertices to respective second output vertices corresponding to the respective second output investigative data obtained for the ones of the second subset of information seeker tools to generate a second iteration of the information graph, the respective first output vertices and the respective second output vertices to be connected with second links identifying the input-output relationships specified by the ones of the second subset of information seeker tools to relate the initial vertex to the respective first output vertices.

9. The apparatus of claim 8, wherein the path is a first path, and:
the pattern recognizer is to traverse the second iteration of the information graph to identify a second path matching a portion of the pattern from the graph schema;
the graph generator is to:
in response to identification of the information path, select one of the information seeker tools capable of expanding the second path to form the first path matching the pattern from the graph schema;
obtain third output investigative data based on the selected one of the information seeker tools; and
connect, based on the graph schema, a third output vertex to the second iteration of the information graph, the third output vertex corresponding to the third output investigative data obtained based on the selected one of the information seeker tools to generate a third iteration of the information graph; and
the pattern recognizer is to determine whether the third output vertex expanded the second path to form the first path.

10. The apparatus of claim 6, further including an information logger to log respective iterations of the information graph in a computer accessible format, and the user interface is to output one or more of the logged iterations of the information graph in response to a request.

11. A method to perform a cybersecurity investigation, the method comprising:
    iteratively generating, by executing an instruction with at least one processor, an information graph based on investigative data in response to detection of a threat alert in a monitored network, the investigative data accessed from information sources based on a set of information seeker tools, respective ones of the information seeker tools specifying input-output relationships between inputs and outputs of the respective ones of the information seeker tools, the respective ones of the information seeker tools specifying procedures to access the information sources to obtain output investigative data satisfying the input-output relationships specified by the respective ones of the information seeker tools for input investigative data applied to the respective ones of the information seeker tools, the information graph generated based on a graph schema specifying possible relationships between the information seeker tools, the information graph including vertices corresponding to the investigative data and links identifying the input-output relationships between the investigative data corresponding to the vertices, the generating of the information graph including:
        beginning with an initial vertex corresponding to first input investigative data associated with the detected threat alert, obtaining respective first output investigative data for ones of a first subset of information seeker tools having respective inputs corresponding to the first investigative data, the respective first output investigative data to be obtained based on the procedures specified by the ones of the first subset of information seeker tools; and
        connecting, based on the graph schema, the initial vertex corresponding to the first input investigative data to respective first output vertices corresponding to the respective first output investigative data obtained for the ones of the first subset of information seeker tools to generate a first iteration of the information graph, the initial vertex and the respective first output vertices to be connected with first links identifying the input-output relationships specified by the ones of the first subset of information seeker tools to relate the initial vertex to the respective first output vertices;
    traversing, by executing an instruction with the at least one processor, the information graph to identify a path in the information graph matching a pattern from the graph schema associated with a cybersecurity threat; and
    outputting, by executing an instruction with the at least one processor, the path identified in the information graph and the cybersecurity threat to an output device.

12. The method of claim 11, wherein the information sources include at least one of a reputation service, a log server or a threat intelligence knowledge database, and the respective ones of the information seeker tools specify respective procedures for accessing the at least one of the reputation service, the log server or the threat intelligence knowledge database to obtain the output data satisfying the input-output relationships specified by the respective ones of the information seeker tools for the input data.

13. The method of claim 11, wherein the generating of the information graph includes:
    obtaining respective second output investigative data for ones of a second subset of information seeker tools having respective inputs corresponding to the respective first output investigative data, the respective second output investigative data to be obtained based on the procedures specified by the ones of the second subset of information seeker tools; and
    connecting, based on the graph schema, the respective first output vertices to respective second output vertices corresponding to the respective second output investigative data obtained for the ones of the second subset of information seeker tools to generate a second iteration of the information graph, the respective first output vertices and the respective second output vertices to be connected with second links identifying the input-output relationships specified by the ones of the second subset of information seeker tools to relate the initial vertex to the respective first output vertices.

14. The method of claim 13, wherein the path is a first path, and the generating of the information graph includes:
    traversing the second iteration of the information graph to identify a second path matching a portion of the pattern from the graph schema;
    in response to identification of the information path, selecting one of the information seeker tools capable of expanding the second path to form the first path matching the pattern from the graph schema;
    obtaining third output investigative data based on the selected one of the information seeker tools;
    connecting, based on the graph schema, a third output vertex to the second iteration of the information graph, the third output vertex corresponding to the third output investigative data obtained based on the selected one of the information seeker tools to generate a third iteration of the information graph; and
    determining whether the third output vertex expanded the second path to form the first path.

* * * * *